United States Patent
Xie et al.

(10) Patent No.: US 12,095,503 B1
(45) Date of Patent: Sep. 17, 2024

(54) WAVELENGTH DEBUGGING METHOD OF MULTI-CHANNEL OPTICAL MODULE AND THE OPTICAL MODULE

(71) Applicant: Wuhan Inphilight Technology Company Limited, Wuhan (CN)

(72) Inventors: Dingbo Xie, Wuhan (CN); Yongzheng Tang, Wuhan (CN); Defeng Zhu, Wuhan (CN); Bo Li, Wuhan (CN)

(73) Assignee: Wuhan Inphilight Technology Company Limited, Wuhan (CN)

( * ) Notice: Subject to any disclaimer, the term of this patent is extended or adjusted under 35 U.S.C. 154(b) by 0 days.

(21) Appl. No.: 18/407,484

(22) Filed: Jan. 9, 2024

(30) Foreign Application Priority Data

Feb. 28, 2023 (CN) .......................... 202310173082.9

(51) Int. Cl.
*H04B 10/03* (2013.01)
*H04B 10/079* (2013.01)

(52) U.S. Cl.
CPC ....... *H04B 10/07957* (2013.01); *H04B 10/03* (2013.01); *H04B 10/07955* (2013.01)

(58) Field of Classification Search
CPC .............. H04B 10/07957; H04B 10/03; H04B 10/07955

(Continued)

(56) References Cited

U.S. PATENT DOCUMENTS

2014/0185312 A1 7/2014 Louderback
2019/0379453 A1 12/2019 Toda et al.

FOREIGN PATENT DOCUMENTS

CN 101592762 A 12/2009
CN 103471813 A 12/2013
(Continued)

*Primary Examiner* — Mohammad R Sedighian
(74) *Attorney, Agent, or Firm* — Bayramoglu Law Offices LLC

(57) ABSTRACT

A wavelength debugging method of multi-channel optical module includes: determine the initial temperature of TEC, and plot the temperature-optical power curve of each channel; obtain temperature $T_{up}$ and $T_{down}$ corresponding to upper and lower limit values of the target wavelength of each channel and the left and right security boundary temperatures $T_{left}'$ and $T_{right}'$ of each channel; compare $T_{up}$, $T_{down}$, $T_{left}'$, $T_{right}'$ of each channel, when the product is qualified, record the middle two values in descending order as $T_1$ and $T_2$, respectively; compare the size of $T_1$ and $T_2$ of each channel, when the product is qualified, take the maximum value of $T_1$ of each channel as $T_{down}'$, and take the minimum value of $T_2$ of each channel as $T_{up}'$, the final setting temperature of TEC is calculated as $T'=(T_{down}'+T_{up}')/2$, and the corresponding wavelength for each channel at this temperature T' is the wavelength after debugging for each channel.

3 Claims, 3 Drawing Sheets

(58) Field of Classification Search
USPC .............................................................. 398/1
See application file for complete search history.

(56) References Cited

FOREIGN PATENT DOCUMENTS

| | | | | | |
|---|---|---|---|---|---|
| CN | 111756469 | A | | 10/2020 | |
| CN | 112564802 | A | | 3/2021 | |
| CN | 113050239 | A | | 6/2021 | |
| CN | 113050239 | B | * | 1/2022 | ................ G02B 6/42 |
| CN | 114285467 | A | | 4/2022 | |
| CN | 115173937 | B | * | 5/2023 | ......... H04B 10/0775 |
| CN | 116886185 | A | * | 10/2023 | ........... H04B 10/079 |

* cited by examiner

WAVELENGTH DEBUGGING METHOD OF MULTI-CHANNEL OPTICAL MODULE AND THE OPTICAL MODULE

CROSS REFERENCE TO THE RELATED APPLICATIONS

This application is based upon and claims priority to Chinese Patent Application No. 202310173082.9, filed on Feb. 28, 2023, the entire contents of which are incorporated herein by reference.

TECHNICAL FIELD

The present invention relates to the optical communication technology field, specifically, to a wavelength debugging method of multi-channel optical module and the optical module.

BACKGROUND

In the long distance optical module, TEC is usually used to control the temperature of the laser, so that the laser always works at a fixed temperature. During debugging, the wavelength of the laser is also adjusted by adjusting the temperature of the TEC to meet the protocol requirements during laser operation. As shown in FIG. 1, the Transmitter Optical Subassembly (TOSA) structure of a typical 100G LR4 (10 km) optical module includes a laser, a TEC, a thermistor, four lens for collimating the light emitted by the laser, a multiplexer (MUX) containing four band-pass filters passing through a specific wavelength, a prism, a convergence lens, and an optical fiber adapter. Typically, the steps to debug the wavelength of the TOSA are as follows: (1) set the initial temperature of TEC (taking 50° C. as the initial temperature); (2) test the wavelengths of four channels; (3) determine whether the wavelengths of four channels meet the protocol; (4) compare the measured wavelength data of the four channels with the protocol wavelength to obtain the deviation value of the wavelength, then, based on the temperature drift coefficient of the wavelength, calculate the temperature setting target value for TEC, then, set the TEC temperature as the target value to ensure that the wavelengths of the four channels meet the protocol requirements.

However, the TEC temperature set according to the above method can ensure that the wavelength is within the protocol range, but due to the manufacturing tolerance of the MUX, there may be deviations in the range of wavelengths that the band-pass filter can pass through, at the same time, there may be angle tolerances in the installation of the MUX, which will change the range of wavelengths that the MUX can pass through, as a result, it cannot be guaranteed that all wavelengths of light that meet the protocol requirements can pass through with relatively small losses. Sometimes, even if it can pass through, the wavelength is not within the wavelength range that the band-pass filter can actually pass through with low loss, for example, as shown in FIG. 2, the boundary (left boundary) of the protocol wavelength is located in the area where the optical power rapidly drops; or if the wavelength is at the boundary of the wavelength range that the band-pass filter can actually pass through, for example, as shown in FIG. 3, the boundary (left boundary) of the protocol wavelength is located at the edge of the rapid drop in optical power; in the above two cases, the optical power is very sensitive to the change of wavelength in the use process, as long as the wavelength changes slightly, the optical power will drop significantly, leading to the failure of the optical module.

SUMMARY

One purpose of the present invention is to provide a wavelength debugging method of multi-channel optical module, which can at least solve some defects in the prior art.

To achieve the above objectives, the present invention adopts the following technical solution:

A wavelength debugging method of multi-channel optical module, comprising the following steps:

1) determine the initial temperature of TEC and $\Delta T$ is used as the stepping, record the output optical power and wavelength of each channel of the optical module at different temperatures, and plot the temperature-optical power curve of each channel of the optical module;

2) obtain the temperature $T_{up}$ and $T_{down}$ corresponding to the upper and lower limit values of the target wavelength of each channel of the optical module, as well as the left security boundary temperature $T_{left}'$ and the right security boundary temperature $T_{right}'$ of the optical power flat region in the temperature-optical power curve of each channel;

3) compare the $T_{up}$, $T_{down}$, $T_{left}'$, $T_{right}'$ of each channel, if any channel's $T_{down} > T_{right}'$, or $T_{up} < T_{left}'$, the optical module product is judged as defective and repaired; otherwise, proceed to step 4);

4) compare the $T_{up}$, $T_{down}$, $T_{left}'$, $T_{right}'$ of each channel, remove the maximum and minimum values, and record the remaining two values in ascending order as $T_1$ and $T_2$ respectively;

5) compare the size of $T_1$ and $T_2$ of each channel, if one or more $T_1$ of each channel is larger than one or more $T_2$ of each channel, the optical module product is judged as defective and repaired; otherwise, proceed to step 6);

6) take the maximum value of $T_1$ of each channel and record it as $T_{down}'$, and take the minimum value of $T_2$ of each channel and record it as $T_{up}'$, then, the final setting temperature of TEC is calculated as $T' = (T_{down}' + T_{up}')/2$, and the corresponding wavelength for each channel at this temperature $T'$ is the wavelength after debugging for each channel.

Further, the selection condition for the initial temperature of TEC in step 1) is to ensure that the obtained temperature-optical power curve of each channel have a complete flat region, and read the range of protocol wavelengths covered by the wavelength of the corresponding channel.

Further, in step 1), $\Delta T$ is set to 1° C.

In addition, the invention also provides an optical module, the optical module utilizes the wavelength debugging method of the multi-channel optical module as described above.

Compared with the prior art, the invention has the following beneficial effects:

The wavelength debugging method of multi-channel optical module provided by the invention can quickly determine the optimum temperature setting of the TEC and the optimal working wavelength of the laser in the optical module, and the determination of the optimal temperature of the TEC comprehensively considers its impact on the wavelength and optical power, which can not only ensure that the wavelength is within the range of the protocol wavelength, but also enable the wavelength to be within the range of the wavelength that the band-pass filter can actually pass through with low loss, reduce the sensitivity of optical power to wavelength changes, thereby improving product stability and reliability.

The following will provide a further detailed explanation of the present invention in conjunction with the accompanying drawings

DETAILED DESCRIPTION OF THE EMBODIMENTS

The following will provide a clear and complete description of the technical solution in the embodiments of the present invention, in conjunction with the accompanying drawings. Obviously, the described embodiments are only a part of the embodiments of the present invention, not all of them. Based on the embodiments in the present invention, all other embodiments obtained by ordinary technicians in the art without creative labor fall within the scope of protection of the present invention.

This embodiment provides a wavelength debugging method of multi-channel optical module, comprising the following steps:

1) determine the initial temperature of TEC and $\Delta T$ is used as the stepping, record the output optical power and wavelength of each channel of the optical module at different temperatures, and plot the temperature-optical power curve of each channel of the optical module. Among them, the selection condition for the initial temperature of TEC is to ensure that the obtained temperature-optical power curve of each channel have a complete flat region, and read the range of protocol wavelengths covered by the wavelength of the corresponding channel; $\Delta T$ is usually set to 1° C.

Figure 1:
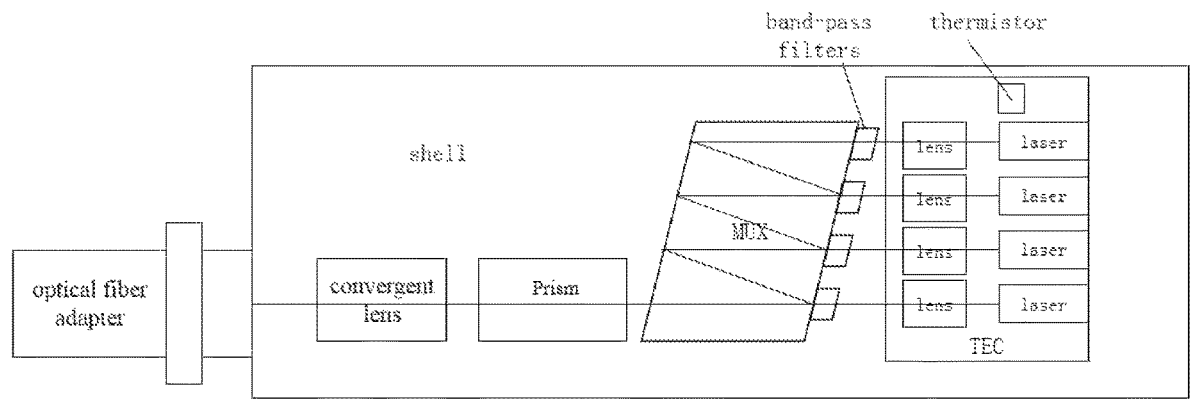
FIG. 1 is the structure diagram of the optical transmission submodule of the existing typical 100G LR4 optical module.
Figure 2:
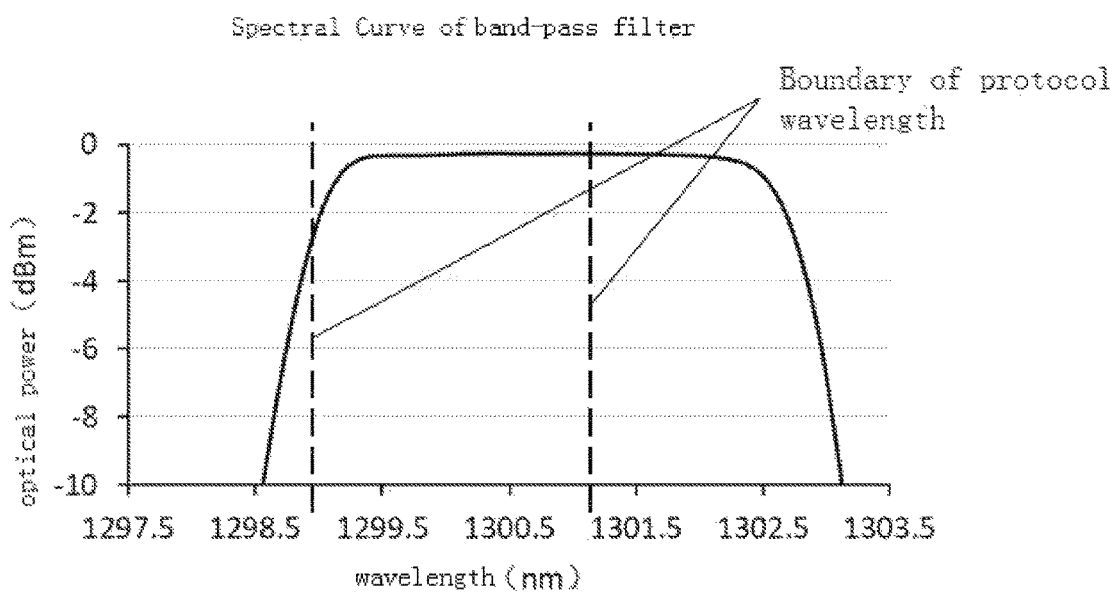
FIG. 2 is a schematic diagram of the boundary of the protocol wavelength located in the region of rapid drop in optical power in existing applications.
Figure 3:
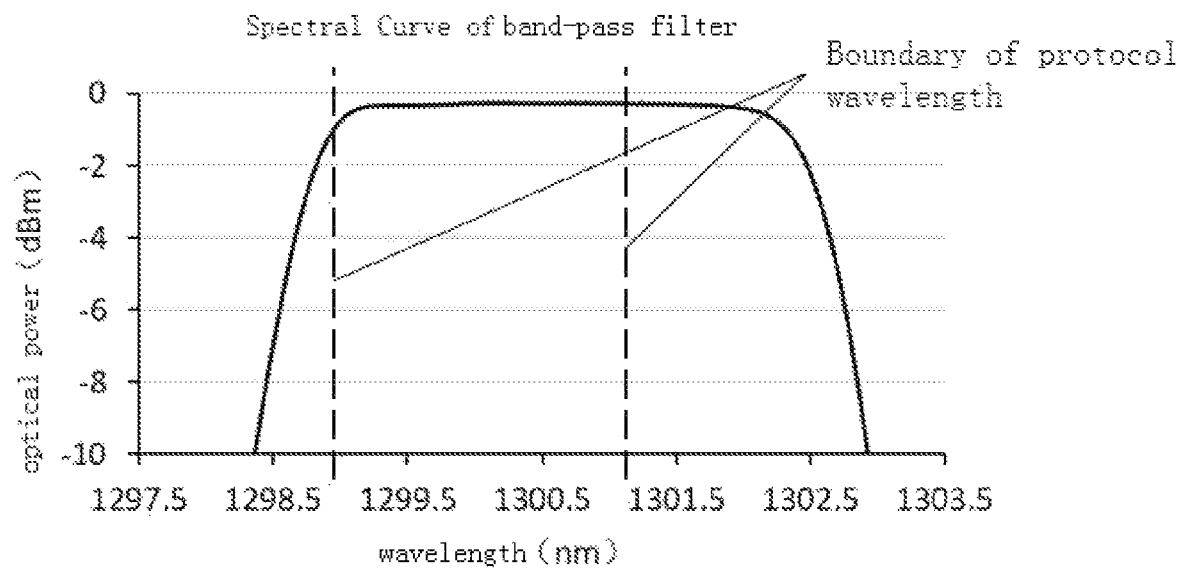
FIG. 3 is a schematic diagram of the boundary of the protocol wavelength located at the edge of the rapid drop in optical power in existing applications.
Figure 4:
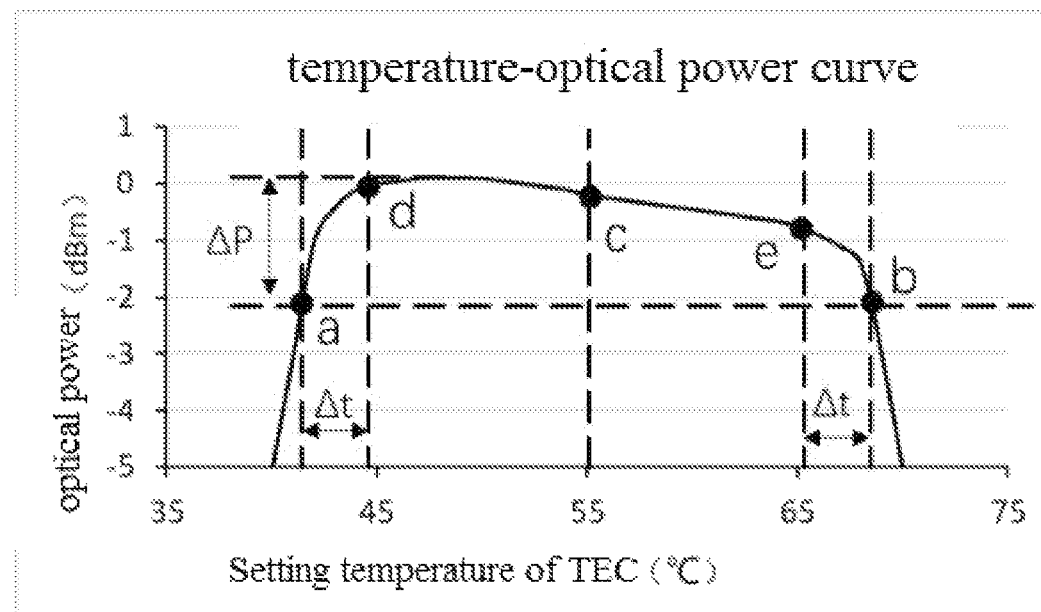
FIG. 4 is the temperature-optical power curve of the present invention.

It should be noted that in the present invention, the definitions of the optical power flat region, the left and right security boundaries of the optical power flat region, and the target wavelength are as follows:

As shown in FIG. 4, when the point with the highest optical power drops to $\Delta P$, the left point a and the right point b are the boundaries, the region between point a and point b is defined as the flat region of optical power, point a is defined as the left boundary of the flat region of optical power, point b is defined as the right boundary of the flat region of optical power, and the midpoint c of points a and b is defined as the midpoint of the flat region of optical power. The optical power point d corresponding to the increase of $\Delta t$ in the abscissa of the left boundary point a is defined as the left security boundary of the optical power flat area, while the optical power point e corresponding to the subtraction of $\Delta t$ from the abscissa of the right boundary point b is defined as the right security boundary of the optical power flat region. Generally, the value of $\Delta P$ is 1-2 dBm, and the value of $\Delta t$ is 1-3° C.

The target wavelength is the wavelength range after scaling $\Delta \lambda$ in the protocol wavelength range, such as the protocol wavelength range of 1294.53 to 1296.59 nm, then, when $\Delta \lambda = 0.2$ nm, the target wavelength ranges from 1294.73 to 1296.39 nm.

2) obtain the temperature $T_{up}$ and $T_{down}$ corresponding to the upper and lower limit values of the target wavelength of each channel of the optical module, as well as the left security boundary temperature $T_{left}'$ and the right security boundary temperature $T_{right}'$ of the optical power flat region in the temperature-optical power curve of each channel.

Taking four channels TOSA as an example, the temperatures corresponding to the upper and lower limit values of the target wavelengths of the four channels are $T_{up1}$ and $T_{down1}$, $T_{up2}$ and $T_{down2}$, $T_{up3}$ and $T_{down3}$, $T_{up4}$ and $T_{down4}$; the temperatures corresponding to the left security boundary d and the right security boundary e of the optical power of four channels are $T_{left1}'$ and $T_{right1}'$, $T_{left2}'$ and $T_{right2}'$, $T_{left3}'$ and $T_{right3}'$, $T_{left4}'$ and $T_{right4}'$.

3) compare the $T_{up}$, $T_{down}$, $T_{left}'$, $T_{right}'$ of each channel, if any channel's $T_{down} > T_{right}'$, or $T_{up} < T_{left}'$, the optical module product is judged as defective and repaired; otherwise, proceed to step 4).

Specifically, take four channels as an example, If $T_{down1} > T_{right1}'$, or $T_{down2} > T_{right2}'$, or $T_{down3} > T_{right3}'$, or $T_{down4} > T_{right4}'$, or $T_{up1} < T_{left1}'$, or $T_{up2} < T_{left2}'$, or $T_{up3} < T_{left3}'$, or $T_{up4} < T_{left4}'$ appears, debugging fails, and the product is judged as defective and needs to be repaired; if the above situation does not occur, proceed to step (4).

4) compare the $T_{up}$, $T_{down}$, $T_{left}'$, $T_{right}'$ of each channel, remove the maximum and minimum values, and record the remaining two values in ascending order as $T_1$ and $T_2$ respectively.

Specifically, take four channels as an example, compare the size of $T_{down1}$, $T_{up1}$, $T_{left1}'$, $T_{right1}'$ of each channel, remove the maximum and minimum values, and record the remaining two values in ascending order as $T_{11}$ and $T_{12}$ respectively, compare the size of $T_{down2}$, $T_{up2}$, $T_{left2}'$, $T_{right2}'$ of each channel, remove the maximum and minimum values, and record the remaining two values in ascending order as $T_{21}$ and $T_{22}$ respectively, compare the size of $T_{down3}$, $T_{up3}$, $T_{left3}'$, $T_{right3}'$ of each channel, remove the maximum and minimum values, and record the remaining two values in ascending order as $T_{31}$ and $T_{32}$ respectively, compare the size of $T_{down4}$, $T_{up4}$, $T_{left4}'$, $T_{right4}'$ of each channel, remove the maximum and minimum values, and record the remaining two values in ascending order as $T_{41}$ and $T_{42}$ respectively.

5) compare the size of $T_1$ and $T_2$ of each channel, if one or more $T_1$ of each channel is larger than one or more $T_2$ of each channel, the optical module product is judged as defective and repaired; otherwise, proceed to step 6); Specifically, take four channels as an example, compare the size of $T_1$, $T_{21}$, $T_{31}$, $T_{41}$ with $T_{12}$, $T_{22}$, $T_{32}$, $T_{42}$, if one or more of $T_{11}$, $T_{21}$, $T_{31}$, $T_{41}$ are larger than one or more of $T_{12}$, $T_{22}$, $T_{32}$, $T_{42}$, debugging fails, and the product is judged as defective and needs to be repaired.

6) take the maximum value of $T_1$ of each channel and record it as $T_{down}'$, and take the minimum value of $T_2$ of each channel and record it as $T_{up}'$, then, the final setting temperature of TEC is calculated as $T' = (T_{down}' + T_{up}')/2$, and the corresponding wavelength for each channel at this temperature T' is the wavelength after debugging for each channel.

Specifically, take four channels as an example, $T_{down}'$ takes the maximum value of $T_{11}$, $T_{21}$, $T_{31}$, $T_{41}$, while $T_{up}'$ takes the minimum value of $T_{12}$, $T_{22}$, $T_{32}$, $T_{42}$.

Taking the four channel optical module as an example, the wavelength debugging method of the multi-channel optical module of the invention is described in detail, and the specific process is as follows:

1. Obtain the protocol wavelength range of four channels, as shown in Table 1; determine the target wavelength range of the four channels based on the protocol wavelengths of the four channels, the target wavelength is the wavelength range after scaling Δλ in the protocol wavelength range, take Δλ=0.2 nm, the target wavelength range of four channels is shown in Table 2.

TABLE 1

Protocol wavelength range of 4 channels

| Channel | Lower limit of protocol wavelength (nm) | Upper limit of protocol wavelength (nm) |
|---|---|---|
| CH1 | 1294.53 | 1296.59 |
| CH2 | 1299.02 | 1301.09 |
| CH3 | 1303.54 | 1305.63 |
| CH4 | 1308.09 | 1310.19 |

TABLE 2

Target wavelength range of 4 channels

| Channel | Lower limit of target wavelength(nm) | Upper limit of target wavelength (nm) |
|---|---|---|
| CH1 | 1294.73 | 1296.39 |
| CH2 | 1299.22 | 1300.89 |
| CH3 | 1303.74 | 1305.43 |
| CH4 | 1308.29 | 1309.99 |

Figure 5:
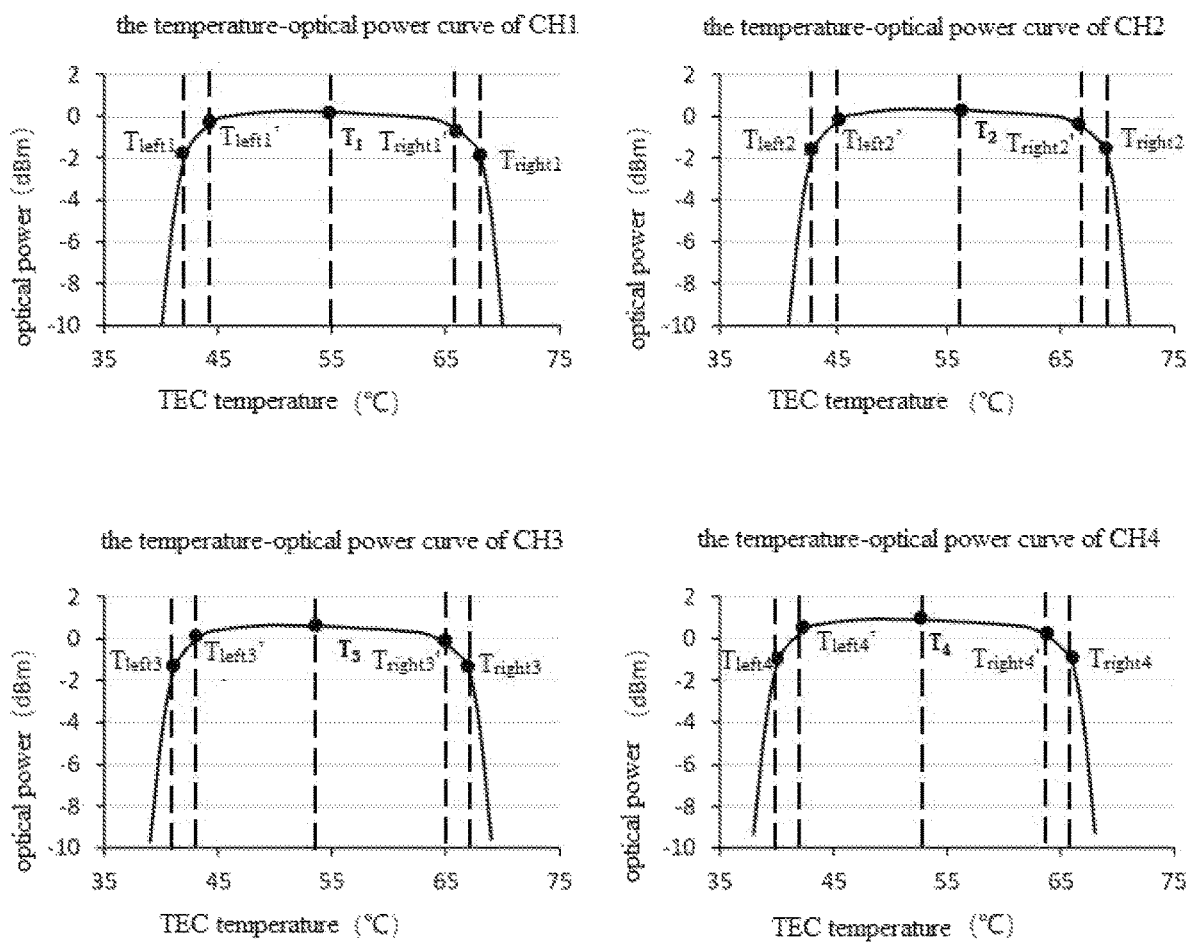
FIG. 5 is the temperature-optical power curve of the four channels in the embodiment of the present invention.

2. The initial temperature of TEC is 35° C., and ΔT=1° C. is used as the stepping, change the temperature of the TEC, test the output optical power and corresponding wavelength of four channels, record the output optical power and corresponding wavelength data of the four channels, as shown in Table 3; and based on the data recorded in Table 3, the TEC temperatures corresponding to the upper and lower limits of the target wavelengths for the four channels are obtained, as shown in Table 4, based on the data recorded in Table 3, the temperature-optical power curves of the four channels are obtained, as shown in FIG. 5, in FIG. 5, $T_{left}$ and $T_{right}$ represent the TEC temperature corresponding to the left boundary and the TEC temperature corresponding to the right boundary of the optical power flat region, respectively; according to FIG. 5, the TEC temperatures corresponding to the left and right security boundaries of the four channel optical power flat regions, namely $T_{left}'$ and $T_{right}'$, are obtained, as shown in Table 5.

TABLE 3

Output optical power and corresponding wavelength of four channels at different temperatures

| TEC temperature (°C) | optical power of Ch1 (dBm) | wavelength of Ch1 (nm) | optical power of Ch2 (dBm) | wavelength of Ch2 (nm) | optical power of Ch3 (dBm) | wavelength of Ch3 (nm) | optical power of Ch4 (dBm) | wavelength of Ch4 (nm) |
|---|---|---|---|---|---|---|---|---|
| 37 | | | | | | | | |
| 38 | | | | | | | −9.4 | 1307.04 |
| 39 | | | | | −9.7 | 1303.25 | −4.3 | 1307.13 |
| 40 | −10.1 | 1294.16 | | 1299.21 | −4.6 | 1303.34 | −1.3 | 1307.22 |
| 41 | −5 | 1294.25 | −10 | 1299.30 | −1.6 | 1303.43 | −0.3 | 1307.31 |
| 42 | −2 | 1294.34 | −4.9 | 1299.39 | −0.6 | 1303.52 | 0.2 | 1307.40 |
| 43 | −1 | 1294.43 | −1.9 | 1299.48 | −0.1 | 1303.61 | 0.6 | 1307.49 |
| 44 | −0.5 | 1294.52 | −0.9 | 1299.57 | 0.3 | 1303.70 | 0.7 | 1307.58 |
| 45 | −0.1 | 1294.61 | −0.4 | 1299.66 | 0.4 | 1303.79 | 0.79 | 1307.67 |
| 46 | 0 | 1294.70 | 0 | 1299.75 | 0.49 | 1303.88 | 0.85 | 1307.76 |
| 47 | 0.09 | 1294.79 | 0.1 | 1299.84 | 0.55 | 1303.97 | 0.9 | 1307.85 |
| 48 | 0.15 | 1294.88 | 0.19 | 1299.93 | 0.6 | 1304.06 | 0.93 | 1307.94 |
| 49 | 0.2 | 1294.97 | 0.25 | 1300.02 | 0.63 | 1304.15 | 0.9 | 1308.03 |
| 50 | 0.23 | 1295.06 | 0.3 | 1300.11 | 0.62 | 1304.24 | 0.93 | 1308.12 |
| 51 | 0.25 | 1295.15 | 0.33 | 1300.20 | 0.61 | 1304.33 | 0.92 | 1308.21 |
| 52 | 0.23 | 1295.24 | 0.35 | 1300.29 | 0.6 | 1304.42 | 0.91 | 1308.30 |
| 53 | 0.22 | 1295.33 | 0.33 | 1300.38 | 0.58 | 1304.51 | 0.9 | 1308.39 |
| 54 | 0.21 | 1295.42 | 0.32 | 1300.47 | 0.55 | 1304.60 | 0.88 | 1308.48 |
| 55 | 0.2 | 1295.51 | 0.31 | 1300.56 | 0.51 | 1304.69 | 0.85 | 1308.57 |
| 56 | 0.18 | 1295.60 | 0.3 | 1300.65 | 0.48 | 1304.78 | 0.81 | 1308.66 |
| 57 | 0.15 | 1295.69 | 0.28 | 1300.74 | 0.45 | 1304.87 | 0.78 | 1308.75 |
| 58 | 0.11 | 1295.78 | 0.25 | 1300.83 | 0.42 | 1304.96 | 0.75 | 1308.84 |
| 59 | 0.08 | 1295.87 | 0.21 | 1300.92 | 0.37 | 1305.05 | 0.72 | 1308.93 |
| 60 | 0.05 | 1295.96 | 0.18 | 1301.01 | 0.33 | 1305.14 | 0.67 | 1309.02 |
| 61 | 0.02 | 1296.05 | 0.15 | 1301.10 | 0.27 | 1305.23 | 0.63 | 1309.11 |
| 62 | −0.03 | 1296.14 | 0.12 | 1301.19 | 0.07 | 1305.32 | 0.57 | 1309.20 |
| 63 | −0.07 | 1296.23 | 0.07 | 1301.28 | −0.25 | 1305.41 | 0.37 | 1309.29 |
| 64 | −0.13 | 1296.32 | 0.03 | 1301.37 | −0.7 | 1305.50 | 0.05 | 1309.38 |
| 65 | −0.33 | 1296.41 | −0.03 | 1301.46 | −1.4 | 1305.59 | −0.4 | 1309.47 |
| 66 | −0.65 | 1296.50 | −0.23 | 1301.55 | −4.3 | 1305.68 | −1.1 | 1309.56 |
| 67 | −1.1 | 1296.59 | −0.55 | 1301.64 | −9.6 | 1305.77 | −4 | 1309.65 |
| 68 | −1.8 | 1296.68 | −1 | 1301.73 | | | −9.3 | 1309.74 |
| 69 | −4.7 | 1296.77 | −1.7 | 1301.82 | | | | 1309.83 |
| 70 | −10 | 1296.86 | −4.6 | 1301.91 | | | | 1309.92 |
| 71 | | | −9.9 | 1302.00 | | | | 1310.01 |

TABLE 4

TEC temperature corresponding to the upper and lower
limits of target wavelengths of four channels

| Channel | TEC temperature $T_{down}$ corresponding to the lower limit of target wavelength (° C.) | TEC temperature $T_{up}$ corresponding to the upper limit of target wavelength (° C.) |
| --- | --- | --- |
| CH1 | 46 | 65 |
| CH2 | 40 | 59 |
| CH3 | 44 | 63 |
| CH4 | 52 | 71 |

TABLE 5 left and right security boundaries of the flat region
of optical power of four channels

| Channel | TEC temperature $T_{left}'$ corresponding to the left security boundary of the flat region of optical power (° C.) | TEC temperature $T_{right}'$ corresponding to the right security boundary of the flat region of optical power (° C.) |
| --- | --- | --- |
| CH1 | 44 | 66 |
| CH2 | 45 | 67 |
| CH3 | 43 | 65 |
| CH4 | 42 | 64 |

3. According to the data in Tables 4 and 5, it can be concluded that $T_{11}$=46° C., $T_{12}$=65° C., $T_{21}$=45° C., $T_{22}$=59° C., $T_{31}$=44° C., $T_{32}$=63° C., $T_{41}$=52° C., $T_{42}$=64° C.; Compare $T_{11}$, $T_{12}$, $T_{13}$, and $T_{14}$ to obtain their maximum value $T_{down}'$=52° C., compare $T_{12}$, $T_{22}$, $T_{32}$, and $T_{42}$ to obtain their minimum value $T_{up}'$=59° C., and finally TEC set temperature T'=($T_{down}'+T_{up}'$)/2=(52+59)/2=55.5° C.

The above examples are only illustrative examples of the present invention and do not constitute a limitation on the scope of protection of the present invention. Any design that is the same or similar to the present invention belongs to the scope of protection of the present invention.

What is claimed is:

1. A wavelength debugging method of a multi-channel optical module for optical communication, comprising the following steps:

1) determine an initial temperature of a thermoelectric cooler (TEC) of the multichannel optical module, where ΔT is a change in temperature of the TEC, record an output optical power and wavelength of each channel of the multi-channel optical module at different temperatures according to a temperature increment of ΔT, and plot a temperature-optical power curve of each channel of the multi-channel optical module;

2) obtain temperature $T_{up}$ and $T_{down}$ corresponding to upper and lower limit temperature values of a target wavelength of each channel of the multi-channel optical module, as well as a left security boundary temperature $T_{left}'$ and a right security boundary temperature $T_{right}'$ of an optical power flat region in the temperature-optical power curve of each channel;

3) compare the $T_{up}$, $T_{down}$, $T_{left}'$, $T_{right}'$ of each channel, if any channel's $T_{down}>T_{right}'$, or $T_{up}<T_{left}'$, the multi-channel optical module is judged as defective and is repaired; otherwise, proceed to step 4);

4) compare the $T_{up}$, $T_{down}$, $T_{left}'$, $T_{right}'$ of each channel, remove maximum and minimum values of the $T_{up}$, $T_{down}$, $T_{left}'$, $T_{right}'$ of each channel, and record the remaining two values in ascending order as $T_1$ and $T_2$ respectively;

5) compare $T_1$ and $T_2$ of each channel, if one or more $T_1$ of each channel is larger than one or more $T_2$ of each channel, the multi-channel optical module is judged as defective and repaired; otherwise, proceed to step 6); and 6) take a maximum value of $T_1$ of each channel and record it as $T_{down}'$, and take a minimum value of $T_2$ of each channel and record it as $T_{up}'$, then, a final setting temperature of TEC is calculated as T'=($T_{down}'+T_{up}'$)/2, and the corresponding wavelength for each channel at this temperature T' is the wavelength after debugging for each channel.

2. The wavelength debugging method of the multi-channel optical module according to claim 1, wherein a selection condition for the initial temperature of the TEC in step 1) is to ensure that the plotted temperature-optical power curve of each channel has a complete flat region, and covers a range of protocol wavelengths for the corresponding channel.

3. The wavelength debugging method of the multi-channel optical module according to claim 1, wherein in step 1), ΔT is set to 1° C.

* * * * *